3,278,584
ALKAMINE ESTERS OF ANTHRANILIC ACID
Robert Allan Scherrer and Franklin Willard Short, Ann Arbor, Mich., assignors to Parke, Davis & Company, Detroit, Mich., a corporation of Michigan
No Drawing. Filed Mar. 27, 1962, Ser. No. 182,917
4 Claims. (Cl. 260—472)

This invention relates to novel anthranilic acid esters and to methods for producing the same. More particularly, the invention relates to aminoalkyl N-(3-trifluoromethylphenyl)-anthranilates of formula,

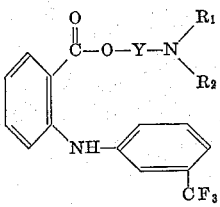

where Y is an alkylene radical containing 2 to 4 carbon atoms inclusive, $R_1$ and $R_2$ are the same or different and represent alkyl groups containing 1 to 3 carbon atoms inclusive; and to acid addition salts thereof.

In accordance with the invention anthranilates of the above formula and acid addition salts thereof are produced by esterifying N-(3-trifluoromethylphenyl)-anthranilic acid of formula,

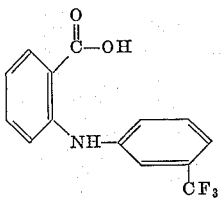

or a reactive derivative thereof with an aminoalcohol of formula,

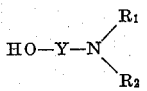

or a reactive derivative thereof; where Y, $R_1$ and $R_2$ have the same significance as given above. This esterification can be carried out in a number of ways. One of the preferred methods involves reacting the N-(3-trifluoromethylphenyl)anthranilic acid with an aminoalkyl halide of formula,

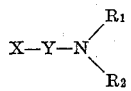

where X is a halogen atom, preferably chlorine or bromine, and Y, $R_1$ and $R_2$ have the same significance as given above. The aminoalkyl halide is preferably utilized in the form of the corresponding hydrohalide salt. For reasons of economy the reaction is usually carried out in the presence of one or more equivalents of a substance having a greater base strength than the aminoalkyl halide. Some examples of suitable basic compounds are tertiary amines such as triethylamine, N-ethyl morpholine, N-ethyl piperidine and inorganic bases such as the alkali metal carbonates, alkali metal bicarbonates, alkaline earth metal carbonates, alkaline earth metal oxides and the like. The reaction is carried out under substantially anhydrous conditions and in an inert organic solvent such as N,N-dimethylformamide, benzene, xylene, toluene, and the like. The relative quantities of the reactants are not particularly critical. Usually, the N-(3-trifluoromethylphenyl)anthranilic acid and the aminoalkyl halide are used in approximately equivalent quantities. When the free anthranilic acid and the free base of the aminoalkyl halide are so used, approximately one equivalent of a basic compound is employed and the desired aminoalkyl N-(3-trifluoromethylphenyl)-anthranilate obtained in the reaction mixture as the free base. Alternatively, when a hydrohalide salt of the aminoalkyl halide is employed, approximately two equivalents of the basic compound are preferably used and the anthranilate obtained in the reaction mixture as the free base. The temperature of the reaction is not critical and may be varied from about 50 to 125° C. The preferred reaction temperature is in the neighborhood of 100° C., that is between about 85 and 110° C.

The esterification can also be carried out by reacting an acid halide of N-(3-trifluoromethylphenyl)-anthranilic acid of formula,

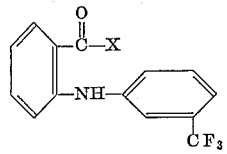

with an aminoalcohol of formula,

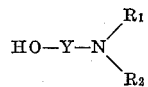

where X is a halogen atom, preferably a chlorine atom, and Y, $R_1$ and $R_2$ have the same significance as given above. The reaction can be carried out by dissolving the reactants in an inert organic solvent and allowing the reaction mixture to stand at ordinary temperature, that is, 20 to 35° C. Some of the organic solvents which can be used for the reaction are aromatic hydrocarbons such as benzene, xylene and toluene; aliphatic hydrocarbons such as pentane and petroleum ether; ethers such as diethyl ether, dibutyl ether and dioxane, and other solvents such as N,N-dimethylformamide. The relative quantities of the two reactants are not critical but it is preferable to use approximately two equivalents of the amino alcohol for each equivalent of the acid chloride of N-(3-trifluoromethylphenyl)-anthranilic acid.

The aminoalkyl N-(3-trifluoromethylphenyl)-anthranilates and their pharmaceutically-acceptable acid addition salts of the invention possess a high degree of anti-inflammatory activity and hence are of value in mitigating the symptoms associated with rheumatic, arthritic and other inflammatory conditions. They are preferably administered by the oral route. The pharmaceutically-acceptable acid addition salts are preferred. Some examples of such salts which can be prepared either as described above or by reaction of the aminoalkyl N-(3-trifluoromethylphenyl)-anthranilate with the corresponding acid are the mineral acid salts such as the hydrochloride, hydrobromide, sulfate, perchlorate, phosphate and hydroiodide, the organic acid salts such as the acetate, propionate, citrate, tartrate, benzoate, naphthoate and maleate; and salts with other strong acids such as the sulfamate, benzene sulfonate and p-toluene sulfonate. The pharmaceutically-acceptable acid addition salts or the aminoalkyl N-(3-trifluoromethylphenyl)-anthranilates themselves can be combined with either a solid or liquid carrier or diluent and made available in varying amounts in such conventional pharmaceutical forms as tablets, dragees, capsules, powders, suspensions, and solutions.

The invention is illustrated by the following examples.

*Example 1.*—14.4 g. of 2-dimethylaminoethyl chloride hydrochloride, 28.1 g. of N-(3-trifluoromethylphenyl)-anthranilic acid, 25 ml. of ethanol, 28 ml. of triethylamine and 100 ml. of ethyl acetate is heated under reflux for 18 hours, cooled and diluted with about 250 ml. of ether. The precipitate of triethylamine hydrochloride is removed by filtration and the filtrate extracted with an excess of dilute hydrochloric acid (10 ml. of concentrated hydrochloric acid in 100 ml. of water). The organic layer is discarded, the acidic aqueous extract is made basic with solid sodium carbonate and the alkaline solution extracted with ether. The ether extract is dried over sodium sulfate and the solution containing the free base of 2-dimethylaminoethyl N - (3 - trifluoromethylphenyl)-anthranilate treated with an excess of gaseous hydrogen chloride. The insoluble 2-dimethylaminoethyl N-(3-trifluoromethylphenyl)-anthranilate hydrochloride is collected and purified by recrystallization from acetone; M.P. 164–166° C.

The free base of 2-dimethylaminoethyl N-(3-trifluoromethylphenyl)-anthranilate can be prepared by dissolving the hydrochloride salt in warm water, alkalizing the solution with 5% sodium hydroxide solution and extracting with ether. The ether extract is dried and the ether removed by distillation to obtain the desired free base.

*Example 2.*—A mixture consisting of 28.1 g. of N-(3-trifluoromethylphenyl)-anthranilic acid, 17.2 g. of 3-dimethylamino-2-methylpropyl chloride hydrochloride, 28 ml. of triethylamine and 125 ml. of N,N-dimethylformamide is heated for 21 hours at 90° C., cooled and diluted with ether. The precipitate of triethylamine hydrochloride is removed by filtration and the filtrate extracted with an excess of dilute hydrochloric acid. The organic layer is discarded, the acidic aqueous extract is made basic with solid sodium carbonate and the alkaline solution extracted with ether. The ether extract is dried over sodium sulfate and the solution containing the free base of 3-dimethylamino-2-methylpropyl N-(3-trifluoromethylphenyl)-anthranilate treated with an excess of gaseous hydrogen chloride. The insoluble 3-dimethylamino - 2 - methylpropyl N - (3 - trifluoromethylphenyl)-anthranilate hydrochloride is collected and purified by recrystallization from ethanol; M.P. 158–159° C.

If the ether solution containing the free base of 3-dimethylamino - 2 - methylpropyl N - (3-trifluoromethylphenyl)-anthranilate is treated with an excess of hydrogen bromide instead of hydrogen chloride one obtains the hydrobromide salt. Alternatively, if one equivalent of benzenesulfonic acid is used instead of hydrogen chloride or hydrogen bromide one obtains 3-dimethylamino-2-methylpropyl N - (3-trifluoromethylphenyl)-anthranilate benzenesulfonate.

*Example 3.*—A mixture consisting of 20 g. of 2-diisopropylaminoethyl chloride hydrochloride, 28.1 g. of N-(3-trifluoromethylphenyl)-anthranilic acid, 28 ml. of triethylamine, 100 ml. of ethyl acetate and 25 ml. of ethanol is heated under reflux for 40 hours, cooled and diluted with ether. The triethylamine hydrochloride is collected by filtration, washed with ether and the ether washings added to the reaction mixture filtrate. The filtrate is shaken with an excess of dilute hydrochloric acid. The organic layer is discarded and the acidic aqueous extract made basic with solid sodium carbonate. The basic solution is extracted with ether and the ether solution containing the free base of the desired 2-diisopropylaminoethyl N-(3-trifluoromethylphenyl)-anthranilate dried over sodium sulfate. The ether solution of the free base is treated with an excess of dry hydrogen chloride and oily hydrochloride salt which separates from the solution collected and recrystallized first from acetone and then from ethyl acetate. The 2 - diisopropylaminoethyl N - (3 - trifluoromethylphenyl)-anthranilate hydrochloride so obtained melts at 136–138° C.

3.0 g. of 2-diisopropylaminoethyl N-(3-trifluoromethylphenyl)-anthranilate hydrochloride is dissolved in warm water and the resulting solution made alkaline with 5% sodium hydroxide solution. The basic solution is extracted with ether, the ether extract dried over sodium sulfate and an equivalent amount of sulfamic acid in ethanol added to the solution. The solvents are evaporated to obtain the desired 2-diisopropylaminoethyl N-(3-trifluoromethylphenyl)-anthranilate sulfamate.

*Example 4.*—18.6 g. of 3-diethylaminopropyl chloride hydrochloride in 25 ml. of ethanol is added to 28.1 g. of N-(3-trifluoromethylphenyl)-anthranilic acid, 28 ml. of triethylamine and 100 ml. of N,N-dimethylformamide, the mixture heated at 90° C. for 19 hours and the reaction mixture cooled. The reaction mixture is diluted with ether, the triethylamine hydrochloride which separates is collected and washed with ether. The ether washings are added to the main reaction mixture filtrate. The filtrate is shaken with an excess of dilute hydrochloric acid and the organic layer discarded. The acidic aqueous extract is made alkaline by the addition of solid sodium carbonate and extracted with ether. The ether extract is dried over magnesium sulfate and the ether solution containing the free base of the desired 3-diethylaminopropyl N-(3-trifluoromethylphenyl)-anthranilate treated with an excess of dry hydrogen chloride. The hydrochloride salt of 3-diethylaminopropyl N-(3-trifluoromethylphenyl)-anthranilate which separates is collected and purified by recrystallization from ethanol; M.P. 163–164° C.

If desired, an equivalent amount of 3-diethylaminopropyl bromide hydrobromide can be substituted for the 3-diethyaminopropyl chloride hydrochloride used in the above procedure. Also, if desired, one may use the free base of the 3-diethylaminopropyl chloride or 3-diethylaminopropyl bromide in the above procedure. In this latter case it is only necessary to use one-half as much triethylamine.

*Example 5.*—A mixture consisting of 28.1 g. of N-(3-trifluoromethylphenyl)-anthranilic acid, 17.2 g. of 2-diethylamino ethyl chloride hydrochloride, 28 ml. of triethylamine, 25 ml. of ethanol and 100 ml. of ethyl acetate is heated under reflux for 17 hours, cooled and diluted with ether. The precipitated triethylamine hydrochloride is removed by filtration and the filtrate extracted with an excess of dilute hydrochloric acid. The organic layer is discarded and the acidic aqueous extract is made basic with solid sodium carbonate. The alkaline solution is extracted with ether, the ether extract dried over sodium sulfate and the solution containing the free base of the desired 2-diethylaminoethyl N-(3-trifluoromethylphenyl)-anthranilate treated with an excess of gaseous hydrogen chloride. The hydrochloride salt of 2-diethylaminoethyl N-(3-trifluoromethylphenyl)-anthranilate which separates from the solution is collected and purified by recrystallization first from acetone and then from ethyl acetate; M.P. 127–129° C.

*Example 6.*—A mixture consisting of 15 g. of the acid chloride of N-(3-trifluoromethylphenyl)-anthranilic acid (prepared by reacting the free acid with excess thionyl chloride at 50° C.), 14 g. of 2-diethylaminoethanol and 150 ml. of benzene is allowed to stand overnight at room temperature. The reaction mixture is washed with 2 N sodium hydroxide solution and then with several portions of saturated sodium chloride. The organic layer is evaporated in vacuo and the residual 2-diethylaminoethyl N-(3-trifluoromethyl-phenyl)-anthranilate taken up in ether. Excess isopropanolic hydrogen chloride is added to the ether solution of the free base and the hydrochloride salt which precipitates is collected. The 2-diethylaminoethyl N-(3-trifluoromethylphenyl)- anthranilate hydrochloride is washed with ether and purified by recrystallization from acetone and also from ethyl acetate; M.P. 127–129° C.

If desired, one can add an excess of dry hydrogen bromide to the ether solution of the free base of 2-diethylaminoethyl N-(3-trifluoromethylphenyl)-anthranilate prepared above to obtain the hydrobromide salt. Alternatively, by adding an equivalent amount of glacial acetic acid to the ether solution of the free base and evaporating the ether one obtains 2-diethylaminoethyl N-(3-trifluoromethylphenyl)-anthranilate acetate.

We claim:
1. A compound of the class consisting of a free base of the formula

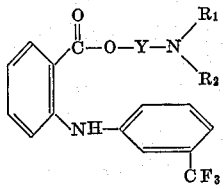

and pharmaceutically-acceptable acid addition salts thereof, where Y is alkylene containing 2 to 4 carbon atoms inclusive, and $R_1$ and $R_2$ are each alkyl containing 1 to 3 carbon atoms inclusive.

2. 2-diethylaminoethyl N-(3-trifluoromethylphenyl)-anthranilate hydrochloride.
3. 3-diethylaminopropyl N-(3-trifluoromethylphenyl)-anthranilate hydrochloride.
4. 2-dimethylaminoethyl N-(3-trifluoromethylphenyl) anthranilate hydrochloride.

References Cited by the Examiner
UNITED STATES PATENTS
2,502,451  4/1950  Goldberg et al. _____ 260—472

OTHER REFERENCES
Yale, J. Med. Pharm. Chem., volume 1, pages 121–33, (1959).

LORRAINE A. WEINBERGER, *Primary Examiner.*

DUVAL T. McCLUTCHEN, *Examiner.*

A. D. ROLLINS, L. A. THAXTON, *Assistant Examiners.*